(12) United States Patent
Jiang

(10) Patent No.: US 11,105,477 B2
(45) Date of Patent: Aug. 31, 2021

(54) STAGE LIGHT FREE FROM DAMAGE OF SUNLIGHT

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd.

( * ) Notice: Subject to any disclaimer, the term of this patent is extended or adjusted under 35 U.S.C. 154(b) by 0 days.

(21) Appl. No.: 17/038,684

(22) Filed: Sep. 30, 2020

(65) Prior Publication Data

US 2021/0010648 A1 Jan. 14, 2021

Related U.S. Application Data

(63) Continuation of application No. PCT/CN2019/123345, filed on Dec. 5, 2019.

(30) Foreign Application Priority Data

Jan. 11, 2019 (CN) .......................... 201910026756.6

(51) Int. Cl.
*F21S 9/03* (2006.01)
*F21V 21/15* (2006.01)
*F21V 21/26* (2006.01)
*F21V 25/00* (2006.01)
*F21W 131/10* (2006.01)

(52) U.S. Cl.
CPC .............. *F21S 9/037* (2013.01); *F21V 21/15* (2013.01); *F21V 21/26* (2013.01); *F21V 25/00* (2013.01); *F21W 2131/10* (2013.01)

(58) Field of Classification Search
CPC ........... F21S 9/037; F21V 21/26; F21V 21/15
See application file for complete search history.

(56) References Cited

U.S. PATENT DOCUMENTS 9,970,611 B2 * 5/2018 Toner ...................... F21S 9/032
2009/0201174 A1 * 8/2009 Greenhoe ............ G08G 1/0955
340/907

(Continued)

FOREIGN PATENT DOCUMENTS

CN 107676670 A 2/2018
CN 107676672 A 2/2018

(Continued)

OTHER PUBLICATIONS

International Search Report for Application No. PCT/CN2019/123345, dated Feb. 28, 2020, pp. 1-3.

*Primary Examiner* — William N Harris
(74) *Attorney, Agent, or Firm* — Lerner, David, Littenberg, Krumholz & Mentlik, LLP

(57) ABSTRACT

A stage light free from damage of sunlight includes a light body and a control assembly, and a light avoiding system. When the light body is in a power-on state, the control assembly controls the light avoiding system not to work; and when the light body is in a power-off state, the control assembly controls the light avoiding system to implement a light avoiding action. According to the present invention, smart light avoiding according to a sunlight status can be achieved by means of a light avoiding system. The light avoiding system has advantages of a high automatic recognition level, a flexible access system, and being cost-effective and easy to implement.

8 Claims, 3 Drawing Sheets

(56) References Cited

U.S. PATENT DOCUMENTS

2011/0242819 A1* 10/2011 Mitchell .............. B60Q 1/0483
362/311.02
2014/0036521 A1* 2/2014 Elliott .................... F21V 29/70
362/459

FOREIGN PATENT DOCUMENTS

| CN | 207539810 U | 6/2018 |
| CN | 108488741 A | 9/2018 |
| CN | 109724035 A | 5/2019 |
| CN | 209309872 U | 8/2019 |
| CN | 209309873 U | 8/2019 |

* cited by examiner

Gravity direction
Direction of a light head

STAGE LIGHT FREE FROM DAMAGE OF SUNLIGHT

CROSS REFERENCE TO RELATED APPLICATIONS

The present application is a continuation of International Application No. PCT/CN2019/123345, filed on Dec. 5, 2019, which claims priority from Chinese Patent Application No. 201910026756.6 filed on Jan. 11, 2019, all of which are hereby incorporated herein by reference.

TECHNICAL FIELD

The present invention relates to the technical field of stage lights, and in particular to a stage light free from damage of sunlight.

BACKGROUND ART

With the continuous improvement of people's living standards, the steady growth of disposable income, the continuous upgrading of consumption concepts, and the continuous improvement of cultural quality, people gradually have greater demand for high-quality and diversified literary and artistic products such as theatrical performance, tourism and entertainment activities, and recreational activities. As an important carrier for the realization of literary and artistic works, performance lighting device is also one of the important devices for urban lighting projects, and has also moved from indoors to outdoors, such as large stadiums, amusement parks, exterior walls of buildings, and large outdoor concert stage venues.

A stage light is a smart light controlled by a DMX512 signal, and a light color, a light spot, and illuminance thereof are superior to those of conventional lights. As a type of smart light developed in recent years, the stage light is usually installed at positions such as a front light, a top light, and a rearward step of the stage, and running programs can be compiled for the color, shape, and graph used during the running of the stage light. For the stage light installed outdoors, in addition to waterproof and dustproof protection, light avoiding protection also need to be taken into account, because when sunlight directly irradiates the lens of the light head of the stage light, the sunlight focused through the lens generates much heat, and overheating for a long time may cause damage to the components inside the stage light, particularly damage to the light source In addition, generally, when a light is in a standby or non-working state, due to reasons such as a counterweight, the light emitting lens assembly of the light faces the sky partially or completely, and the position of the stage light is generally relatively fixed after installation. During the day with sufficient sunlight, the sunlight passes through the light emitting lens assembly and directly irradiates the interior of the light, causing the belt and assemblies made of materials such as plastic inside the light to be damaged due to high temperature. For example, the maximum temperature resistance of the belt is 140° C., and the temperature resistance of a plastic product is generally 120° C. Especially in the southern summer, the duration of sunshine is long, and the lens has a certain light focusing effect, which further increases the temperature inside the light assembly and greatly reduce the service life of the light.

SUMMARY

On this basis, in order to overcome the defects of the prior art, the present invention provides a stage light free from damage of sunlight, so as to protect internal elements of the stage light.

In order to achieve the above object, a stage light free from damage of sunlight according to the present invention comprises a light body and a control assembly, and further comprises a light avoiding system. When the light body is in a power-on state, the control assembly controls the light avoiding system not to work; and when the light body is in a power-off state, the control assembly controls the light avoiding system to implement a light avoiding action.

The light avoiding action may be rotating the light body to achieve light avoiding, or arranging a light shading element at a light emitting end of the light body to achieve light shading, or achieving dynamic light avoiding according to the change of an irradiation angle of the sunlight. The control of the control assembly can be used to achieve smart light avoiding in multiple manners.

According to one embodiment, the light body comprises a light head, a light base, and a driving electric motor that drives the light head to rotate relative to the light base, and the light avoiding action is implemented in such way that the control assembly controls the driving electric motor to rotate so that the light head avoids sunlight.

By means of rotary connection between the light head and the light base, when the light body is in the power-on state, the control assembly does not control the driving electric motor to perform the light avoiding action. Only when the light body is in the power-off state, will the control assembly control the driving electric motor to rotate, and the rotation of the rotation shaft of the driving electric motor will drive the light head to rotate so as to achieve light avoiding. Therefore, the light avoiding action in the present invention does not affect the normal working of the stage light, and light avoiding is implemented only when the stage light is not in use, so that the operation will be smarter.

According to one embodiment, the light avoiding system further comprises a gravity sensor for detecting the gravity direction of the stage light, and the control assembly comprises a main controller for calculating an included angle $\alpha$ between the direction of the light head of the stage light and the gravity direction. When $\alpha$ is within the range of a first included angle, the main controller controls the driving electric motor to drive the light head to rotate, and adjusts the angle of $\alpha$ to be within the range of a second included angle, wherein the first included angle is an included angle at which sunlight irradiates the interior of the light head; and the second included angle is an included angle at which the sunlight cannot irradiate the interior of the light head.

The first included angle is especially greater than or equal to 90°, and the second included angle ranges from 0° to 45°.

The gravity sensor is a new type sensor technology in which a cantilever displacer made of an elastic sensitive element and an energy storage spring made of an elastic sensitive element are used to drive electrical contacts to implement conversion from gravity changes to electrical signals. The installation methods for a stage light are complex and variable, such as some stage lights are arranged on the top of the stage, some stage lights are arranged on the side of the stage, or some stage lights are arranged on horizontal steps, however, the gravity direction is generally fixed. Therefore, the orientation of the light head can be adjusted in real time according to the gravity direction, so that sunlight can be effectively prevented from irradiating the interior of the light body, and the adjustment method can be much smarter. The light avoiding system is in operation when the stage light stops working. Therefore, when the stage light stops working, the gravity detector detects the gravity direction and transmits the signal to the main controller, and the main controller calculates an included angle between the direction in which the light head is facing at this time and the gravity direction. Since the gravity direction is vertically downward, when α is within 90 degrees, the light head is facing the horizontal direction. In this case, the interior of the light head may still be irradiated by sunlight. Therefore, the rotation of the light head can be adjusted downwards to reduce the angle of a, thereby achieving smart light avoiding.

Generally, the irradiation of sunlight is strongest at a certain angle in the angles at which the light head faces the sun, and after the light head rotates to the two sides thereof, the irradiation intensity will decrease so as to achieve light avoiding. The first included angle is an angle at which the sunlight can pass through the light head and irradiate the interior of the light, and the second included angle is an included angle at which the sunlight cannot irradiate the interior of the light head.

A gravity sensor is used to detect an installation position of a stage light, and a main controller calculates included angles between the directions of a light head and a gravity direction and compares the angles until the smallest included angle is calculated. That is, the light head of the stage light is adjusted towards the gravity direction as close as possible to prevent the sunlight from irradiating the lens of the light head. The light avoiding system has advantages of a high automatic recognition level, a flexible access system, and being cost-effective and easy to implement.

It should be noted that the light avoiding system according to the present invention starts to work only when the light source of a stage light stops working, so that the normal working of the stage light is not affected. A detector arranged inside the stage light can be used to detect whether the light source is in a working state, and a controller performs further control.

Preferably, when α is greater than or equal to 90°, the main controller controls the driving electric motor to drive the light head to rotate, so as to adjust the angle of α to 0° to 15°.

In order to further ensure that the interior of the light head will not be irradiated by sunlight, according to the present invention, the angle of α is further reduced, and the angle being set to 0° to 15° can basically avoid sunlight irradiation.

According to one embodiment, the light base comprises a base and a light arm. The light head is rotatably connected to the light arm.

The base may be fixed on the top of the stage, the side wall of the stage or the rearward step of the stage through a fastening member. The fastening member may be a fixed bracket or directly fastened with threads. The light arm is connected to the base, and the light arm is rotatably connected to the light head, so that the light head can face different angles, thereby enlarging the irradiation range.

Further, the gravity sensor and the main controller are arranged in the base.

In order to ensure that the sensing of the gravity sensor is more accurate, the relative position of the gravity sensor after installation should be relatively fixed. Therefore, the gravity sensor is arranged in the base. In addition, the main controller is a precise element, and in order to avoid damage caused by line movement, the main controller is also arranged in the base.

Particularly, the light arm is in a U shape, and an inner side of the U-shaped light arm is rotatably connected to the light head.

The light arm is configured in a U shape so that the light head can be fixed on the inner side of the light arm, which facilitates stability of the light head and prevents an irradiation effect from being affected by shaking.

Further, the lamp arm is rotatably connected to the base.

In order to implement a larger irradiation angle and irradiation range of the stage light, the light arm is rotatably connected to the base, so as to implement irradiation on two sides.

Particularly, the light head comprises a cylindrical optical element portion and a circular truncated cone-shaped lens portion. The cylindrical optical element portion and the lens portion are detachably connected, and the lens portion is provided with a lens.

Heat dissipation needs to be performed as a light source and an electric board provided inside the optical element portion. Therefore, the optical element portion is arranged in a cylindrical shape to increase a heat dissipation space. The lens portion is mainly installed with a fixed lens or other optical lenses. In order to achieve better light focusing, the lens portion is arranged in a circular truncated cone shape. The detachable connection between the optical element portion and the lens portion may be threadably rotatory connection, so as to implement rapid replacement of the lens portion and facilitate realization of different optical effects.

According to one embodiment, the light avoiding system further comprises a solar panel arranged on the light body. When the light body is in the power-on state, the control assembly controls the solar panel not to work; and when the light body is in the power-off state, the control assembly controls the solar panel to generate electricity, and the driving electric motor uses electric energy to drive the light head to rotate so that the light head avoids sunlight.

The light body may be installed outdoors to achieve stage lighting effects. The control assembly is arranged inside the light body to control the light body to power on or power off and control the working of the solar panel. For the hanging stage light, the light body may be hung on the top or the side of the stage through a hanger bracket, and the light body is rotatably connected to the hanger bracket. When the light body is in the power-off state, the control assembly controls the solar panel to generate electricity, and the driving system uses electric energy to drive the light body to rotate so that the light emitting end of the light body faces the ground, and the internal components of the light body are protected.

Therefore, in the daytime, when the light is powered off, the sunlight passes through the lens at the light emitting end and irradiates the interior of the light, causing damage to the sheet metal, plastic parts, belt, and the like of the light. However, by means of the solar panel, electricity is generated when there is sunlight, and electric energy is used to drive the light emitting end of the light body to face the ground, which protects the light and also saves energy, which is environmentally friendly. In rainy or cloudy days, there is no sunlight, and the solar panel does not work. The light body will not be damaged even if the light emitting end thereof faces the sky. The solution is smarter and more effective.

According to one embodiment, the light avoiding system comprises a light shading assembly arranged at a light emitting end of the light body, The light avoiding action is that the control assembly controls the light shading assembly to close so as to shade the light emitting end.

A light source is further provided inside the light body. The light source may be an LED light source, and comprises a light emitting end. The light shading assembly is arranged at the light emitting end and can be arranged at the position of the light outlet, so as to protect the internal parts of the light body. The light shading assembly may be opened and closed by sliding on one side or sliding on both sides.

Therefore, according to the present invention, by setting a closed state and an open state for the light shading assembly, a light path may not be affected, and the state can be changed according to the use state of the stage light, which is more targeted. In addition, the light shading assembly is arranged not only at the light emitting end but also in the interior of the light body. Therefore, the structure is compact, and the volume of the light body will not be additionally increased.

Further, the light emitting end of the light body is provided with a fixed lens and a magnifying lens, and the light shading assembly is arranged between the fixed lens and the magnifying lens.

The fixed lens is fixedly installed at the light emitting end to implement the function of protecting the internal members. The magnifying lens is used to enhance the lighting effect, and arranged on the outside of the fixed lens in a detachable connection manner, so as to implement rapid replacement. Therefore, after the light ray emitted from the light source end passes through the fixed lens, the light ray is emitted from the magnifying lens. Other optical functional parts such as a fogging lens and an image function board can be arranged between the fixed lens and the magnifying lens, so as to implement multiple optical effects.

The light shading assembly is arranged between the fixed lens and the magnifying lens. In one aspect, because the fixed lens protects the internal parts of the light body, the light shading assembly can further prevent the internal parts from being exposed to light, and therefore, dual protection is implemented. In addition, because the magnifying lens is detachably connected, the light shading assembly can be quickly overhauled and maintained by detaching the magnifying lens, thereby saving time costs, and the magnifying lens also has a certain protective effect on the light shading assembly, avoiding bumping damage to the light shading assembly during transportation.

The light shading assembly comprises a light shading plate, and a driving system that drives the light shading plate to be open and close, the light shading plate is slidably connected to the light body, and the driving system is electrically connected to the control assembly.

The light shading plate may be driven by an individual driving system, which is independent of the power supply drive of the stage light. The control assembly is also connected to the driving system and an external power supply, so as to implement dual control. When the stage light is in the power-off state, the power supply inside the driving system can be connected to the control assembly, and the light shading plate can be controlled according to the instructions of the control assembly.

Particularly, the light shading plate is made of aluminum alloy, magnesium alloy or plastic.

The light shading plate may be arranged in a detachable sliding connection manner, which is convenient for detachment and replacement. Therefore, there are many choices for materials of the light shading plate, such as aluminum alloy, magnesium alloy or plastic.

According to one embodiment of the present invention, the light avoiding system comprises a signal detector which is arranged inside the light body and used for detecting if light body is in power-on state or power-off state.

The signal detector is configured to detect whether the stage light is in the power-on state or in the power-off state, which can be determined by detecting the current status inside the light body. The stage light is generally connected to an external power supply, and therefore the signal detector can intuitively and accurately detect the working status of the stage light.

The signal detector can be used in different light avoiding systems mentioned above. When the signal detector detects that the light body is in the power-on state, the control assembly controls the solar panel not to work; and when the signal detector detects that the light body is in the power-off state, the control assembly controls the solar panel to generate electricity.

Similarly, the stage light further comprises a signal detector arranged inside the light body. When the signal detector detects that the light body is in the power-on state, the control assembly controls the light shading assembly to open; and when the signal detector detects that the light body is in the power-off state, the control assembly controls the light shading assembly to close so as to shade the light emitting end.

An accumulator is further provided inside the light body so that when the light body is in the power-off state, the accumulator provides electric energy for the light avoiding system.

The accumulator is electrically connected to the main controller. When the interior of the stage light is powered off, the main controller starts the accumulator. The accumulator thus continues to supply power to the driving electric motor and the gravity sensor. The gravity sensor measures the gravity direction and transmits a measurement result to the main controller. The main controller adjusts the angle of an included angle according to an included angle between the gravity direction and the direction of the light head, so as to achieve light avoiding. When the light source is connected to an external power supply, the accumulator will be charged by an external battery so as to achieve smart control.

According to the present invention, the light avoiding system further comprises a sunlight detector for detecting sunlight.

The sunlight detector is mainly configured to detect whether the sunlight irradiates the stage light. In order to implement smarter light avoiding protection, the sunlight detector may be arranged above the light head. When the sunlight is detected and the internal light source is in the power-off state, the main controller detects and calculates an included angle between the direction of the light head and the gravity direction, and adjusts the included angle to be within the range of the second included angle so as to achieve light avoiding.

Beneficial effects of the present invention are as follows:

(1) According to the present invention, smart light avoiding according to a sunlight status can be achieved by means of a light avoiding system. The light avoiding system can be in multiple light avoiding manners that can be set separately or in a combination manner. Such configuration is more targeted.

(2) A gravity sensor is used to detect an installation position of a stage light, and a main controller calculates included angles between the directions of a light head and a gravity direction and compares the angles until the smallest included angle is calculated, that is, the light head of the stage light is adjusted towards the gravity direction as close as possible to prevent the sunlight from irradiating the lens of the light head. Such light avoiding system has advantages of a high automatic recognition level, a flexible access system, and being cost-effective and easy to implement.

(3) By setting a closed state and an open state for a light shading assembly, a light path may not be affected, and the state can be changed according to the use state of the stage light, which is more targeted. In addition, the light shading assembly is arranged not only at a light emitting end but also in the interior of the light body. Therefore, the structure is compact, and the volume of the light body will not be additionally increased.

(4) By means of a solar panel, electricity is generated when there is sunlight, and electric energy is used to drive the light emitting end of the light body to face the ground, which protects the light and also saves energy and is environmentally friendly. In rainy or cloudy days, there is no sunlight, and the solar panel does not work. The light body will not be damaged even if the light emitting end thereof faces the sky. The solution is smarter and more effective.

DETAILED DESCRIPTION OF EMBODIMENTS

Figure 1:
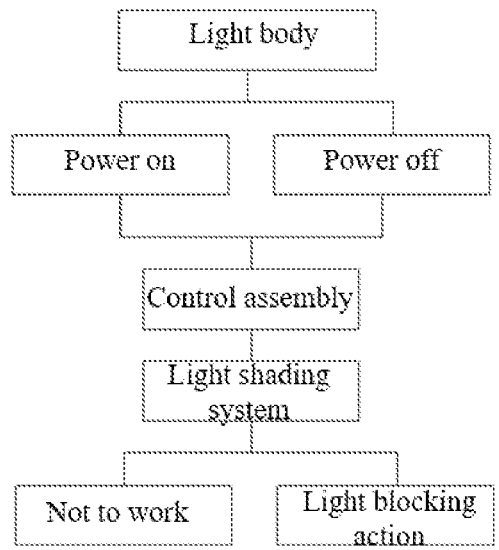
FIG. 1 is a simplified working block diagram of a light shading system of a stage light according to the present invention.

In order to make the objectives, technical solutions, and advantages of the implementation of the present invention clearer, the technical solutions in the embodiments of the present invention will be described in more detail below in conjunction with the drawings in the embodiments of the present invention. The same or similar reference numerals throughout the drawings represent the same or similar elements or the elements having the same or similar functions. The described embodiments are some rather than all of the embodiments of the present invention. The embodiments described below with reference to the drawings are exemplary and are intended to explain the present invention, but should not be construed as limiting the present invention. Based on the embodiments of the present invention, all other embodiments obtained by those of ordinary skill in the art without involving any inventive effort fall within the scope of protection of the present invention. The embodiments of the present invention will be described in detail below with reference to the drawings.

Embodiment 1

As shown in FIG. 1, a stage light free from damage of sunlight comprises a light body and a control assembly, and further comprises a light avoiding system. When the light body is in a power-on state, the control assembly controls the light avoiding system not to work; and when the light body is in a power-off state, the control assembly controls the light avoiding system to implement a light avoiding action to make the stage light to avoid the sunlight.

Figure 2:
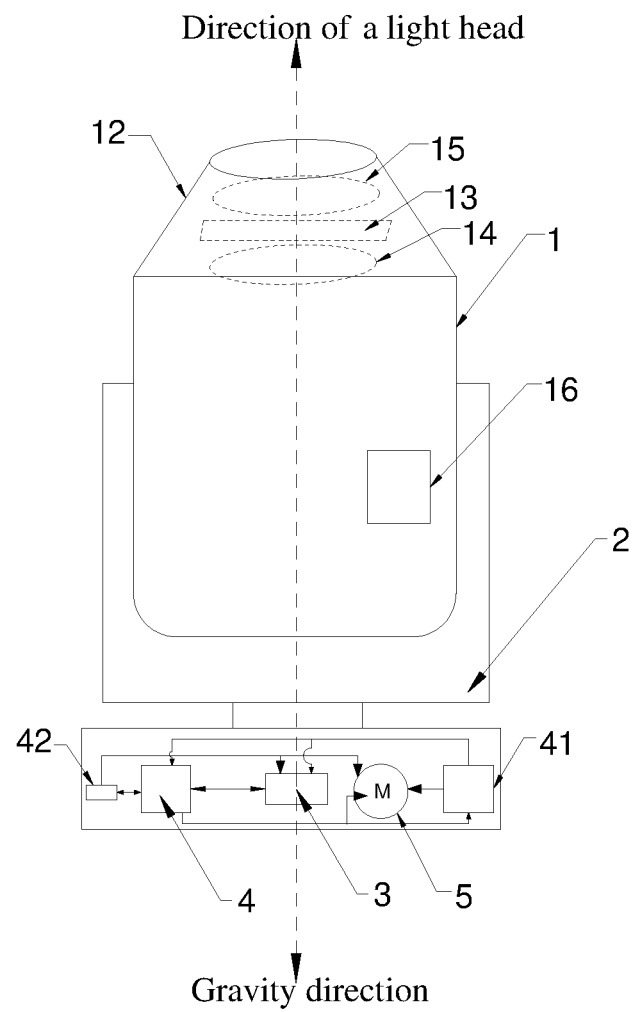
FIG. 2 is a schematic diagram of an overall composition of a stage light according to the present invention.

As shown in FIG. 2, the light body comprises a light head 1, a light base 2, and a driving electric motor 5 that drives the light head 1 to rotate relative to the light base 2, and the light avoiding action is that the control assembly controls the driving electric motor 5 to rotate so that the light head 1 avoids sunlight.

Figure 3:
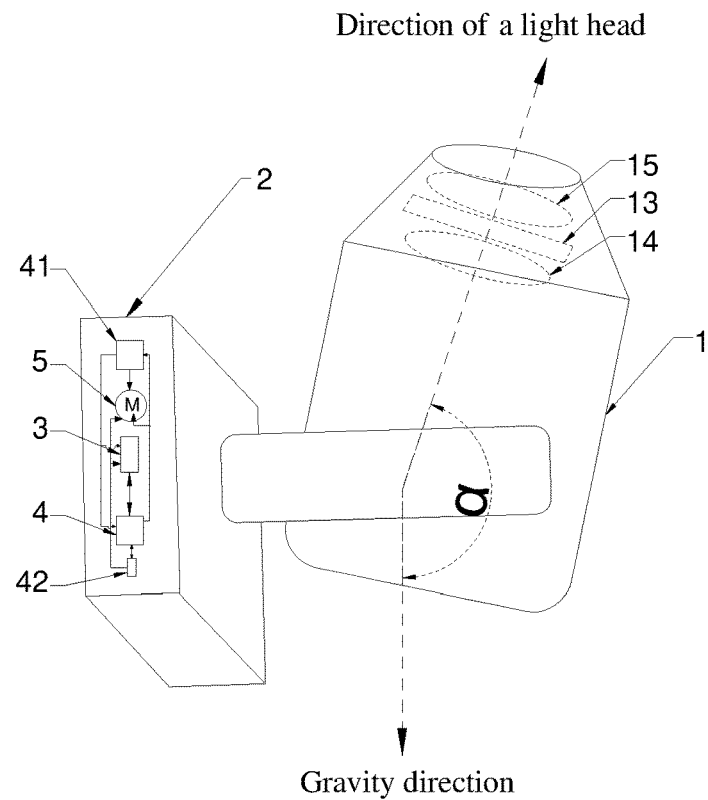
FIG. 3 is a schematic diagram of a stage light installed laterally according to the present invention.

With reference to FIG. 3, the light avoiding system comprises a gravity sensor 3 for detecting a gravity direction of the stage light, and the control assembly comprises a main controller 4 for calculating an included angle α between the direction of the light head 1 of the stage light and the gravity direction. When α is within the range of a first included angle, the main controller 4 controls the driving electric motor 5 to drive the light head 1 to rotate, and adjusts the angle of α to be within the range of a second included angle, wherein the first included angle is an included angle at which sunlight irradiates the interior of the light head 1; and the second included angle is an included angle at which the sunlight cannot irradiate the interior of the light head 1.

The first included angle is greater than or equal to 90°, and the second included angle ranges from 0° to 45°.

Figure 4:
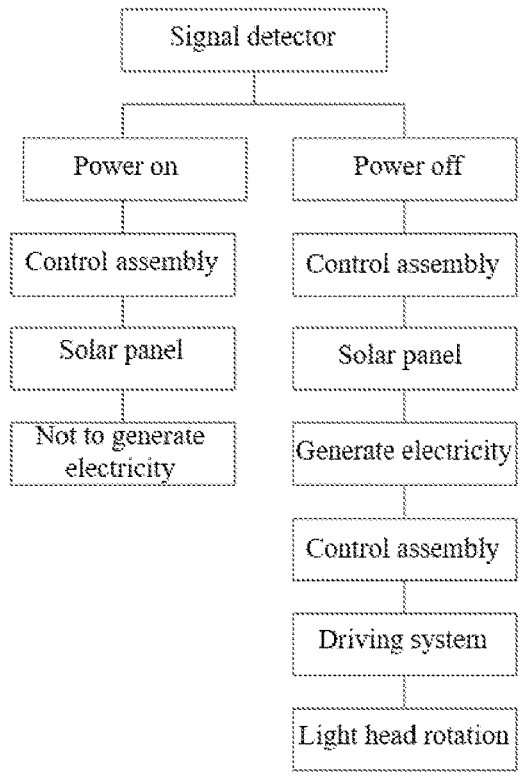
FIG. 4 is a block diagram of signal control of a light shading system according to the present invention.

As shown in FIG. 4, the light avoiding system comprises a signal detector which is arranged inside the light body and used for detecting if the light body is power-on or not. The light avoiding system further comprises a solar panel 41 arranged on the light body. When the light body is detected in the power-on state, the control assembly controls the solar panel 41 not to work, and when the light body is detected in the power-off state, the control assembly controls the solar panel 41 to generate electricity, and the driving electric motor 5 uses electric energy to drive the light head 1 to rotate so that the light head 1 avoids sunlight.

An accumulator 42 can be further provided inside the light body. When the light body is in the power-off state, the accumulator 42 provides electric energy for the light avoiding system.

The light avoiding system further comprises a sunlight detector 16 for detecting sunlight.

When the sunlight is detected, the signal detector of the light avoiding system will detect if the light body is power-on or not. Thus, when there is sunlight and the light body is in the power-off state, the main controller 4 will detect and calculate the included angle between the direction of the light head and the gravity direction, then adjust the included angle to be within the range of the second included angle so as to achieve light avoiding.

Therefore, the specific light avoiding operations of the stage light described in this embodiment are as follows. When the signal detector detects that the light body is in the power-off state, the accumulator 42 provides power for the sunlight detector 16. Then, when the sunlight detector 16 detects that the light head 1 is at a position that the sunlight irradiates, the main controller controls the solar panel 41 to generate electricity to provide electric energy for the driving electric motor 5. At the same time, the main controller 4 calculates, according to the data of the gravity sensor, the included angle α between the gravity direction and the direction that the light head 1 faces. If α is greater than or equal to 90°, the control assembly controls the driving electric motor 5 to rotate the light head 1 to 0° to 45°, so that the sunlight cannot irradiate the interior of the light head 1, thereby protecting the internal electrical elements of the light head 1. In addition, the accumulator 42 continues to provide electric energy for the light body, and the above-mentioned operation will follow the change of the sunlight direction so as to achieve smart control.

Embodiment 2

In this embodiment, as shown in FIG. 2, a stage light free from damage of sunlight comprises a light head 1, a light base 2, and a driving electric motor 5. With reference to FIG. 3, the light head 1 and the light base 2 are in rotary connection by means of the driving electric motor 5. The light avoiding system comprises a gravity sensor 3 for detecting the gravity direction of the stage light, and a main controller 4 for calculating an included angle α between the direction of the light head 1 of the stage light and the gravity direction. When α is within the range of a first included angle, the main controller 4 controls the driving electric motor 5 to drive the light head 1 to rotate, and adjusts the angle of α to be within the range of a second included angle, in which the first included angle is an included angle at which sunlight irradiates the interior of the light head 1; and the second included angle is an included angle at which the sunlight cannot irradiate the interior of the light head 1.

The first included angle is greater than or equal to 90°, and the second included angle ranges from 0° to 45°.

Figure 5:
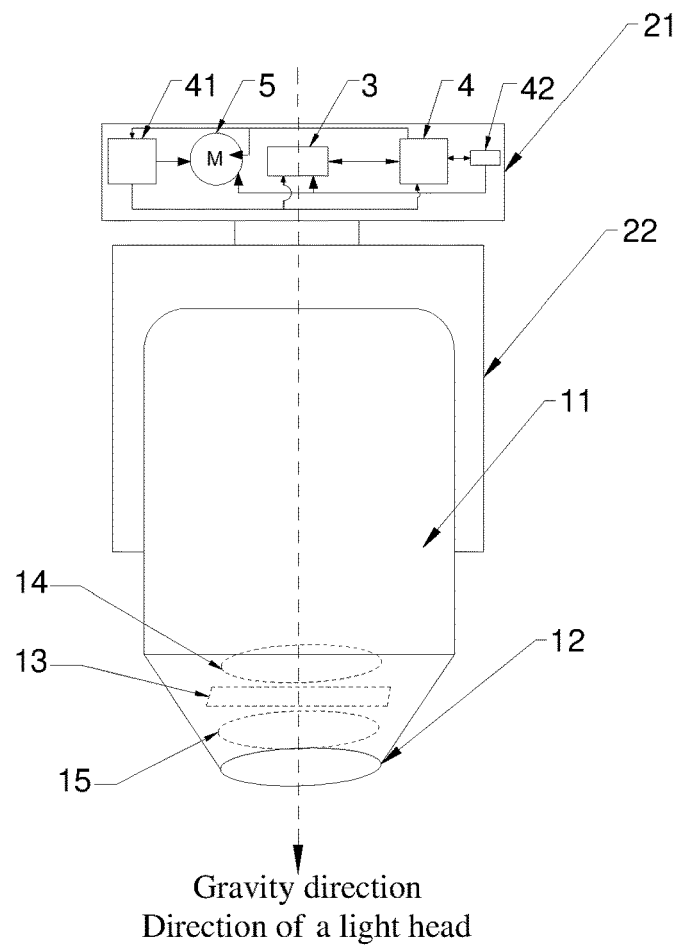
FIG. 5 is a schematic diagram of a stage light installed inversely according to the present invention.

As shown in conjunction with FIG. 5, the light base 2 comprises a base 21 and a light arm 22. The light head 1 is rotatably connected to the light arm 22.

As shown in conjunction with FIGS. 2, 3, and 5, the gravity sensor 3 and the main controller 4 are arranged in the base 21.

The light arm 22 is in a U shape, and an inner side of the U-shaped light arm 22 is rotatably connected to the light head 1.

The lamp arm 22 is rotatably connected to the base 21.

According to the present embodiment, as shown in FIG. 5, the light head 1 comprise a cylindrical optical element portion 11 and a circular truncated cone-shaped lens portion 12. The cylindrical optical element portion 11 and the lens portion 12 are detachably connected through, for example, threadably rotatory connection or snap-fit connection. The lens portion 12 is provided with a lens.

The light base 2 is further provided with an accumulator 42. When the stage light stops working, the accumulator 42 provides electric energy for the main controller 4, the driving electric motor 5 and the gravity sensor 3.

According to the present embodiment, the stage light is also provided with a solar panel 41. When the stage light stops working, but within sunlight, the solar panel 41 will absorb solar energy to generate electricity and provides electric energy for the main controller 4, the driving electric motor 5 and the gravity sensor.

The protection apparatus further comprises a sunlight detector 16 for detecting sunlight.

Therefore, the specific light avoiding operations of the stage light described in this embodiment are as follows. When the light body is in the power-off state, the accumulator 42 provides power for the sunlight detector 16. Then, when the sunlight detector 16 detects that the light head 1 is at a position that the sunlight irradiates, the main controller 4 calculates, according to the data of the gravity sensor, an included angle α between the gravity direction and the direction that the light head 1 faces. If a is greater than or equal to 90°, the control assembly controls the driving electric motor 5 to rotate the light head 1 to 0° to 45°, so that the sunlight cannot irradiate the interior of the light head 1, thereby protecting the internal electrical elements of the light head 1. In addition, the accumulator 42 continues to provide electric energy for the light body, and the above-mentioned operation will follow the change of the sunlight direction so as to achieve smart control.

Embodiment 3

The difference between this embodiment and Embodiment 1 lies in that, when α is greater than or equal to 90°, the main controller 4 controls the driving electric motor 5 to drive the light head 1 to rotate, so as to adjust the angle of α to 0° to 15°.

Embodiment 4

The present embodiment provides a stage light protection system for preventing damage from sunlight comprises a light body, a driving system, a control assembly, and a solar panel 41 arranged on the light body. As shown in FIG. 4, when the light body is in a power-on state, the control assembly controls the solar panel 41 not to work; and when the light body is in a power-off state, the control assembly controls the solar panel 41 to generate electricity, and the driving system uses electric energy to drive the light body to rotate, so that a light emitting end of the light body faces the ground.

The protection system further comprises a signal detector arranged inside the light body. When the signal detector detects that the light body is in the power-on state, the control assembly controls the solar panel 41 not to work; and when the signal detector detects that the light body is in the power-off state, the control assembly controls the solar panel 41 to generate electricity.

The solar panel 41 is arranged on one side of the light body.

The light body comprises a light base 2 and a light head 1 rotatably connected to the light base 2, the control assembly is arranged in the light base 2, the light head 1 comprises a light source and a light emitting lens. When the light body is in the power-off state, the control assembly controls the solar panel 41 to generate electricity, and the driving system uses electric energy to drive the light emitting assembly to rotate, so that the light emitting lens faces the ground.

The driving system comprises a driving electric motor 5, and the driving electric motor 5 is arranged at the junction between the light base 2 and the light head. 1

Therefore, the specific light avoiding operations of the stage light in this embodiment are as follows. When the detector detects that the interior of the light body is in the power-off state, the control assembly controls the solar panel 41 to work. When there is sunlight outside, the solar panel 41 provides electric energy for the driving electric motor 5, so that the driving electric motor 5 drives the light head 1 to rotate, thereby achieving smart light avoiding. When there is no sunlight, the solar panel 41 cannot work, which also proves that there is no sunlight in the current environment, and therefore no light irradiates the interior of the light head 1.

Embodiment 5

Figure 6:
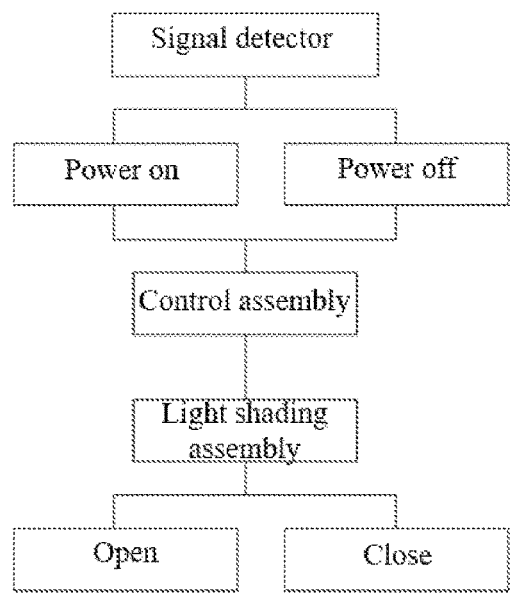
FIG. 6 is a block diagram of signal control of a light shading assembly according to the present invention.

According to this embodiment, a stage light free from damage of sunlight comprises a light body, a control assembly arranged inside the light body, and a light shading assembly 13 arranged at a light emitting end of the light body. As shown in FIG. 6, when the light body is in a power-on state, the control assembly controls the light shading assembly 13 to open; and when the light body is in a power-off state, the control assembly controls the light shading assembly 13 to close so as to shade the light emitting end.

The light emitting end of the light body is provided with a fixed lens 14 and a magnifying lens 15, and the light shading assembly 13 is arranged between the fixed lens 14 and the magnifying lens 15.

The stage light further comprises a signal detector arranged inside the light body. When the signal detector detects that the light body is in the power-on state, the control assembly controls the light shading assembly 13 to open; and when the signal detector detects that the light body is in the power-off state, the control assembly controls the light shading assembly 13 to close so as to shade the light emitting end.

The light shading assembly 13 comprises a light shading plate, and a driving system that drives the light shading plate to be open and close, the light shading plate is slidably connected to the light body, and the driving system is electrically connected to the control assembly.

The driving system comprises a battery that provides electric energy and an electric motor that drives the light shading plate to be open and close, and the electric motor is electrically connected to the control assembly.

The light shading plate is made of aluminum alloy, magnesium alloy or plastic.

Therefore, the specific light avoiding operations of the stage light in this embodiment are as follows. When the signal detector detects that the light body is in the power-off state, the accumulator 42 provides power for the light shading assembly 13 and the control assembly, and the control assembly controls the light shading assembly 13 to work, so that the driving system drives the light shading plate to shade the light head 1, thereby achieving smart light avoiding. When there is no sunlight, the light shading assembly 13 does not need to work, and therefore no light irradiates the interior of the light head.

In addition, a sunlight detector 16 may be further provided according to this embodiment, when the signal detector detects that the interior of the light body is in the power-off state, the accumulator 42 provides power for the light shading assembly 13 and the control assembly, and when the sunlight detector 16 detects that the light head 1 is at a position that the sunlight irradiates, the control assembly controls the light shading assembly 13 to work, so that the driving system drives the light shading plate to shade the light head 1, thereby achieving smart light avoiding. When there is no sunlight, the light shading assembly 13 does not need to work, and therefore no light irradiates the interior of the light head 1.

The above implementations are merely used for illustrating rather than limiting the technical solutions of the present invention; and although the present invention has been described in detail with reference to the preferred implementations, those skilled in the art should understand that modifications or equivalent substitutions may be made to the technical solutions of the present invention without departing from the spirit and scope of the technical solutions of the present invention. Those skilled in the art can further make other changes within the spirit of the present invention for the design of the present invention, provided that the changes do not depart from the technical effects of the present invention. These changes made according to the spirit of the present invention should all be comprised in the scope of protection claimed by the present invention.

The invention claimed is:

1. A stage light free from damage of sunlight, comprising a light body and a control assembly, and further comprising a light avoiding system, wherein when the light body is in a power-on state, the control assembly controls the light avoiding system not to work; and when the light body is in a power-off state, the control assembly controls the light avoiding system to implement a light avoiding action, wherein the light body comprises a light head, a light base, and a driving electric motor that drives the light head to rotate relative to the light base, and the light avoiding action is that the control assembly controls the driving electric motor to rotate so that the light head avoids sunlight, and wherein the light avoiding system comprises a gravity sensor for detecting a gravity direction of the stage light, and the control assembly comprises a main controller for calculating an included angle α between a direction of the light head of the stage light and the gravity direction, and wherein when α is within the range of a first included angle, the main controller controls the driving electric motor to drive the light head to rotate, and adjusts the angle of α to be within the range of a second included angle, in which the first included angle is an included angle at which sunlight is capable of irradiating an interior of the light head; and the second included angle is an included angle at which the sunlight is not capable of irradiating the interior of the light head.

2. The stage light according to claim 1, wherein the first included angle is greater than or equal to 90°, and the second included angle ranges from 0° to 45°.

3. The stage light according to claim 1, wherein the light avoiding system comprises a solar panel arranged on the light body, when the light body is in the power-on state, the control assembly controls the solar panel not to work; and when the light body is in the power-off state and there is sunlight, the control assembly controls the solar panel to generate electricity, and the driving electric motor uses electric energy to drive the light head to rotate so that the light head avoids sunlight.

4. The stage light according to claim 1, wherein the light avoiding system comprises a light shading assembly arranged at a light emitting end of the light body, and the light avoiding action is that the control assembly controls the light shading assembly to close so as to shade the light emitting end.

5. The stage light according to claim 3, wherein a light emitting end of the light body is provided with a fixed lens and a magnifying lens, and the light shading assembly is arranged between the fixed lens and the magnifying lens.

6. The stage light according to claim 1, wherein the light avoiding system comprises a signal detector which is arranged inside the light body and used for detecting if the light body is in the power-on state or not.

7. The stage light according to claim 1, wherein an accumulator is further provided inside the light body, when the light body is in the power-off state, the accumulator provides electric energy for the light avoiding system.

8. The stage light according to claim 1, wherein the light avoiding system further comprises a sunlight detector for detecting sunlight.

* * * * *